(No Model.)  A. C. ELLITHORPE.  2 Sheets—Sheet 1.
SAFETY DEVICE FOR HOISTING APPARATUS.
No. 255,956.  Patented Apr. 4, 1882.
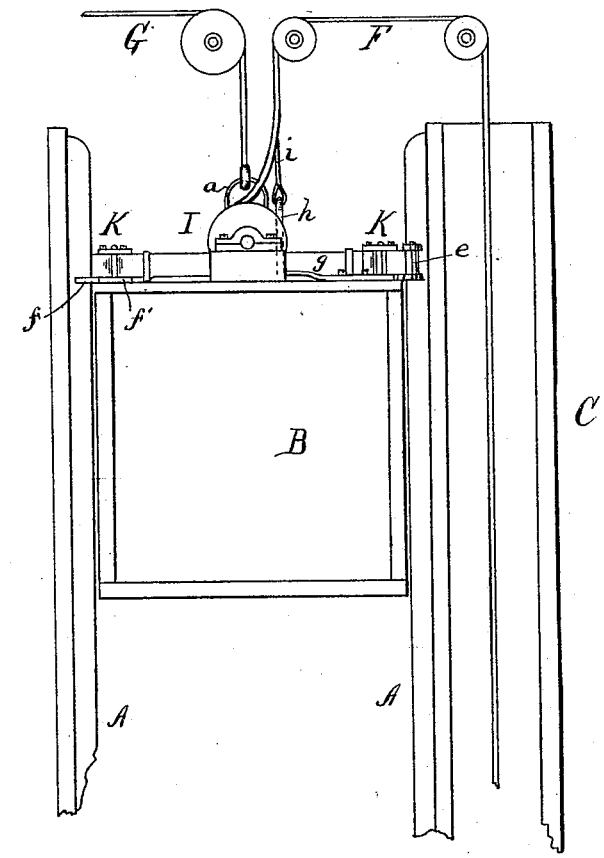
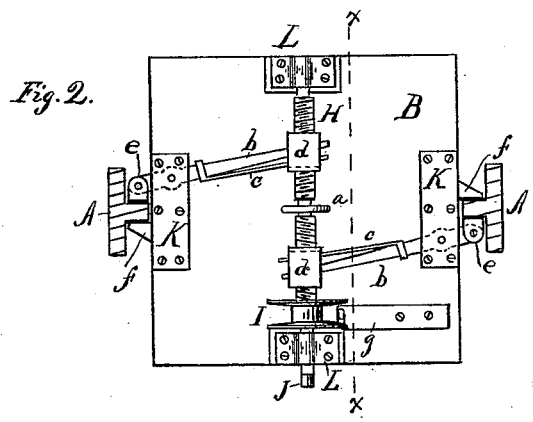

(No Model.) A. C. ELLITHORPE. 2 Sheets—Sheet 2.
SAFETY DEVICE FOR HOISTING APPARATUS.

No. 255,956. Patented Apr. 4, 1882.

Witnesses—
P. Everett Brown
Albert H. Adams.

Inventor—
Albert C. Ellithorpe.

UNITED STATES PATENT OFFICE.

ALBERT C. ELLITHORPE, OF CHICAGO, ILLINOIS.

SAFETY DEVICE FOR HOISTING APPARATUS.

SPECIFICATION forming part of Letters Patent No. 255,956, dated April 4, 1882.

Application filed August 2, 1881. (No model.)

*To all whom it may concern:*

Be it known that I, ALBERT C. ELLITHORPE, residing at Chicago, in the county of Cook and State of Illinois, and a citizen of the United States, have invented certain new and useful Improvements in Safety Devices for Hoisting Apparatus, of which the following is a full description, reference being had to the accompanying drawings, in which—

Figure 3:
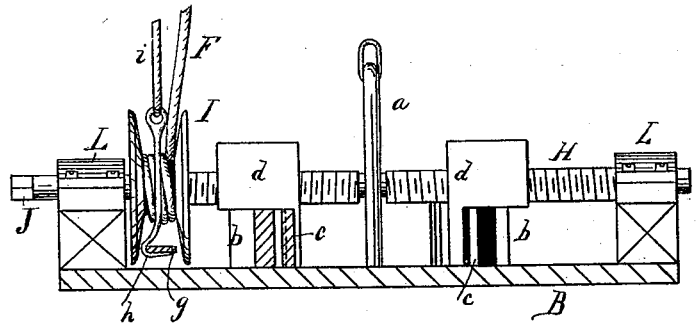
Figure 5:
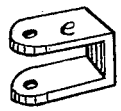
Figure 6:
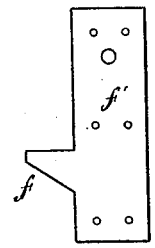
Figure 4:
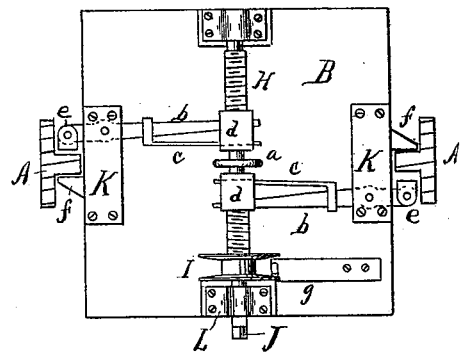

Figure 1 is a front elevation of a cage set in guideways, and of the air-tube in section; Fig. 2, a top or plan view of the cage with the shoes set; Fig. 3, a cross-section of the top of the cage on line $x$ $x$ of Fig. 2; Fig. 4, a top or plan view of the cage with the guide-shoes open; Fig. 5, a detached view of the adjustable guide-shoe, and Fig. 6 a detached view of the guide-plate with its fixed guide.

The object of this invention is to provide additional safety attachments to a hoisting-elevator, and to improve the construction and operation of the air-shaft connected therewith; and its nature consists in providing the cage with adjusting-shoes operated by strong levers connecting with a right and left operating-screw, and in the parts and combinations of parts hereinafter more fully described and claimed.

In the drawings, A indicates the guideways; B, the cage; C, the air-tube; D, the weight; E, the air-valve; F, the cord or rope for the operating-weight in the air-tube; G, the main or hoisting rope; H, the screw-shaft; I, the spool or pulley from the shaft H; K, blocks; L, journals or bearings for shaft H; $a$, staple or fastening-connection for the rope G; $b$, levers; $c$, springs; $d$, screw-blocks; $e$, hinged or adjusting clamp and guide-shoes; $f$, fixed guide-shoes; $g$, spring; $h$, hook; $i$, branch cord for connecting the hook $h$ with the cord or rope F; $j$, angular portion of the shaft H.

The guides A are placed in the ordinary well or passage-way of the elevator. The cage B is made in any of the well-known forms, except the part where my improvements are applied.

The air-tube C may be made in the form shown in the previous application made by me. In the form shown it is open at the top, so that the valve E is operated by suction, or by the tendency to create a vacuum below the weight D. The weight D has sufficient play in the tube to permit the air to pass when it is ascending or descending at the ordinary rates of speed, and the valve E is sufficiently rigid to prevent its closing down on the weight in the ordinary travel of the elevator. This valve is slightly larger than the tube in which it runs, so that when any sudden or rapid movement is made it will close down against the weight with a pressure against the inner walls of the tube and prevent the passage of air, thereby causing a vacuum, the effect of which will be increased as the weight D continues ascending at other than ordinary speed.

The tube C may be made angular in cross-section, or it may be round and be made of wood or iron.

As shown, the air-tube is located by the side of the elevator-passage; but it may be located at any other convenient point, with the rope F extended over, so as to operate it properly.

In the form shown I have applied my improved clamping devices at the top of the cage; but it is evident that they can be readily applied to the bottom, if desired. The block K, as shown, is made of two plates, the upper one of which is a straight flat plate. The lower one, $f'$, is of the same form and size, and has at its side the guide or fixed clamp $f$. Two of these blocks are used, and they are made alike; but I have applied them in opposite directions, as shown; and to these blocks K, I pivot the levers $b$, which levers at their outer ends carry the adjusting-guide and clamp-shoes $e$, and their inner ends are operated by the screw-blocks $d$, which have a downward projection, as shown in Fig. 3.

The levers $b$ are provided with springs $c$, which give the levers an easier movement and prevent the sudden griping of the guide-shoes upon the guideways. The adjusting-shoes $e$, being pivoted to the ends of the levers, will always conform to the form of the guideways A, and will always bring the pressure of the levers properly against the guideways.

The blocks $d$ are operated by the screw-shaft H, which is provided with right and left screws, so that the rotation of the shaft in one direction causes the inner ends of the levers $b$ to approach each other, and thereby free the guideways from any clamping action, while the rotation of the shaft in the opposite direction spreads the inner ends of the levers apart and applies the pressure of the clamping guide-shoes against the guideways. In order to prevent this apparatus from affecting the usual operations of the elevator, I hold them out of operation by a spring, g, with which the hook h engages.

The hook is connected with the cord F by the branch cord i, which is shorter than the portion of the cord F which extends beyond it. This extension of the cord F is wound upon the pulley or spool I with a sufficient number of turns to give the shaft H the required number of revolutions to set the adjusting shoes firmly against the guideways, and the spring is given sufficient strength to give the weight its ordinary operations, but to spring away and release the hook h when any unusual strain or movement occurs. I prefer the hook and spring shown; but for this last-mentioned purpose a small cord which will break under strain, as set forth in my said previous application, may be used in the place of the cord i, with its hook and spring.

The shaft H is provided at one end with an angular portion, j, to which I apply a small hand-wheel, or a crank for rewinding the cord F upon the spool I, and for winding said cord around the spool of the shaft and bringing the hook down, so that it can be engaged with the spring g whenever the spring and hook become separated or the cord F unwound.

As shown, the shaft H extends the full width of the cage; but it is evident that this will not be necessary on cages of any considerable size, as three or four turns of the shaft are sufficient to set the clamping guide-shoes against the guideways.

In operation, when the elevator is doing its ordinary work, these devices are inoperative, and the shoes e f act only as guides for the cage and permit the cage to run freely up and down. When, however, the speed of the cage from any cause becomes accelerated the action of the air upon the weight D and its valve increases the strain upon the cord F, and consequently upon the cord i, causing the spring g to yield and to release the hook h, which operation transfers the strain to that portion of the cord F which is wound upon the spool or hub I and rotates the shaft H until the cord F is unwound. This rotation of the screw-shaft spreads the inner ends of the levers b apart and presses the adjusting-shoes e against the guide-plates, which movement also, by the action of the lever-pivots, brings the fixed guides f against the guide-plates and causes them to clamp the guide-plate firmly. The screw movement is such that the force exerted upon the guiding clamp-plates continually increases, so as to bring the cage to an easy stop upon the guideway. In order to still further ease the stop, I have provided the levers b with the springs c, which assist in making the yielding movement more gradual.

While the springs improve the action of the devices, it is evident that they will operate without them.

The number of turns to be given to the shaft H to produce a sufficient pressure to stop the cage will depend upon the number or pitch of the threads on the shaft. Three turns of the shaft, with four threads to the inch on the screw, will ordinarily be sufficient, as the brake-shoes can run very close to the guideways without producing friction in the ordinary movements of the cage; but it will be seen that if more revolutions of the shaft H are desired all that is required is to give the cord F more turns around the spool or hub I.

What I claim as new, and desire to secure by Letters Patent, is—

1. The combination of the levers b, the guide-shoes e pivoted thereto, and guide-shoes f, fixed to the elevator-cage for operation in connection with the elevator-guideways, substantially as described.

2. The combination of the levers b, the shoes e, pivoted thereto, the guide-shoes f, fixed to the elevator-cage, and mechanism for operating the levers, substantially as described.

3. The combination of the screw-shaft H and traveling nuts d with the levers b, the shoes e, and guideways A, on which the shoes act, substantially as described.

4. The combination of the cord F and spool I with the screw-shaft H, cord i, hook h, and spring g, substantially as described.

5. The combination of the cord F, spool I, separating-cord i, and screw-shaft H with the traveling nuts d, levers b, and clamping guide-shoes e, substantially as described.

6. The combination of the springs c with the levers b, shoes e, screw-shaft H, traveling nuts d, and guideways A, on which the shoes act, substantially as described.

7. The combination of the elevator-cage, the screw-shaft H, and cord F with the air-tube C, weight or plunger D, and a tripping device between the elevator-cage and the said cord, substantially as described.

ALBERT C. ELLITHORPE.

Witnesses:
ALBERT H. ADAMS,
O. W. BOND.